United States Patent
Shimizu et al.

(10) Patent No.: US 7,359,117 B2
(45) Date of Patent: Apr. 15, 2008

(54) ILLUMINATION DEVICE FOR MICROSCOPE

(75) Inventors: Keiji Shimizu, Fussa (JP); Yasushi Aono, Yokohama (JP)

(73) Assignee: Olympus Corporation, Tokyo (JP)

( * ) Notice: Subject to any disclaimer, the term of this patent is extended or adjusted under 35 U.S.C. 154(b) by 79 days.

(21) Appl. No.: 10/810,183

(22) Filed: Mar. 26, 2004

(65) Prior Publication Data

US 2004/0196550 A1  Oct. 7, 2004

(30) Foreign Application Priority Data

Apr. 4, 2003  (JP) ............................. 2003-101650

(51) Int. Cl.
  *G02B 21/06*  (2006.01)
(52) U.S. Cl. ..................... 359/388; 359/358; 359/368
(58) Field of Classification Search ................ 359/388
  See application file for complete search history.

(56) References Cited

U.S. PATENT DOCUMENTS

| | | | |
|---|---|---|---|
| 5,061,049 A | 10/1991 | Hornbeck | |
| 5,587,832 A * | 12/1996 | Krause | 359/385 |
| 6,128,077 A * | 10/2000 | Jovin et al. | 356/310 |
| 6,243,197 B1 * | 6/2001 | Schalz | 359/388 |
| 6,483,641 B1 * | 11/2002 | MacAulay | 359/385 |
| 2003/0063376 A1 * | 4/2003 | Shimizu et al. | 359/380 |
| 2003/0086145 A1 * | 5/2003 | DeSimone et al. | 359/290 |
| 2004/0047034 A1 * | 3/2004 | Sander | 359/385 |
| 2004/0061914 A1 * | 4/2004 | Miyawaki et al. | 359/1 |

FOREIGN PATENT DOCUMENTS

| | | |
|---|---|---|
| JP | 7-134250 A | 5/1995 |
| JP | 2000-502472 A | 2/2000 |

* cited by examiner

*Primary Examiner*—Stephone B. Allen
*Assistant Examiner*—Lee Fineman
(74) *Attorney, Agent, or Firm*—Frishauf, Holtz, Goodman & Chick, P.C.

(57) ABSTRACT

A illumination device for microscope, which has a illumination axis, includes illumination unit, which emits rays of illumination light, for illuminating a specimen, a field stop projection lens, which is located on the illumination axis between the illumination unit and specimen, a light deflector array, which is located on the illumination axis between the illumination unit and field stop projection lens in conjugation with the specimen, the light deflector array having micro optical deflection portions, which individually deflect the rays of illumination light from the illumination unit, and switch unit for switching between a state in which the rays of illumination light is applied to the specimen and a state in which the rays of illumination light is not applied to the specimen.

6 Claims, 3 Drawing Sheets

ILLUMINATION DEVICE FOR MICROSCOPE

CROSS-REFERENCE TO RELATED APPLICATIONS

This application is based upon and claims the benefit of priority from prior Japanese Patent Application No. 2003-101650, filed Apr. 4, 2003, the entire contents of which are incorporated herein by reference.

BACKGROUND OF THE INVENTION

1. Field of the Invention

The present invention relates to an illumination device for a microscope.

2. Description of the Related Art

In general, a microscope having a Koehler illumination comprises a field stop function to illuminate the same range as an observation range. For example, when determining a part in a visual field as an observation range at the time of a fluorescence observation, there is adopted a mode that reduces a field stop and illuminates only a necessary part in the visual field in order to avoid a deterioration of a specimen outside the observation range or discoloration of fluorescence.

Further, in recent years, there are FRAP (Fluorescence Recovery After Photobleaching) observation to observe movement of materials in a cell and FLIP (Fluorescence Loss in Photobleaching) observation by partially discoloring in the visual field at the time of fluorescence observation and utilizing its recovery state. Alternatively, there is an observation method to dye with a caged reagent having characteristics chemically sealed therein, restore the characteristics only at an illuminated part by partially applying rays of illumination light and observe its diffusion. These observation methods require means capable of illuminating a part in the visual filed with an arbitrary size or shape at the time of, e.g., fluorescence observation.

In order to illuminate a part in the visual field, for example, Jpn. Pat. Appln. KOKAI Publication No. 7-134250 and PCT National Publication No. 2000-502472 disclose a liquid crystal stop mode that determines a transmission liquid crystal device (LCD) arranged at an aperture position as a field stop. This mode not only match an observation range with an illumination rage by a control over shading of the transmission liquid crystal device but also can illuminate a part in the visual field with an arbitrary size or shape.

Furthermore, PCT National Publication No. 2000-502472 proposes a use of a DMD (Digital Micromirror Device) with a different light modulation structure in place of the liquid crystal device (LCD).

In general, the DMD comprises a protection glass in order to protect a micromirror. Rays of light reflected from a surface of the protection glass and rays of light reflected from gaps existing between micromirrors adjacent to each other, but they are weak, become rays of stray light. Since the rays of stray light do not depend on a control over the micromirrors, they always illuminate an entire specimen including an unnecessary range. Therefore, the specimen cannot be completely protected from the stray light beam by only the control over the micromirrors.

The rays of stray light from the protection glass and the gaps between the micromirrors are much weaker than the rays of light reflected from the micromirrors and do not lead to a problem in many cases. However, when an intensity of rays of illumination light is high or when an illumination time of rays of illumination light is long, affection to the specimen must be taken into consideration.

For example, in general fluorescence observation, even in a case that only one cell in cells cultured in a laboratory dish is to be illuminated, cells other than an observation target are irradiated with rays of illumination light due to the stray light. When the stray light is applied for a long time, cells other than the observation target may possibly have discoloration or may be weakened in some cases.

Moreover, in the above-described FRAP observation, since rays of illumination light having a high intensity is applied to a range in which discoloration is performed, an affect of the stray light cannot be ignored even if it is the stray light having a relatively low intensity. When an application time is long in particular, the entire specimen including a range in which discoloration is not necessary is undesirably subjected to discoloration in no small measure due to the stray light. Therefore, in the FRAP requiring discoloration on a partial fluorescence level, even if regular partial discoloration processing is carried out, there is a possibility that a contrast may be reduced when performing fluorescence observation on the entire specimen. When the contrast is low in this manner, not only the observation cannot be accurately performed, but an observation result cannot be obtained in some cases.

BRIEF SUMMARY OF THE INVENTION

The present invention is directed to a illumination device for microscope, which suppresses illumination of undesired areas. The illumination device, which has a illumination axis, includes illumination unit, which emits rays of illumination light, for illuminating a specimen, a field stop projection lens, which is located on the illumination axis between the illumination unit and specimen, a light deflector array, which is located on the illumination axis between the illumination unit and field stop projection lens in conjugation with the specimen, the light deflector array having micro optical deflection portions, which individually deflect the rays of illumination light from the illumination unit, and switch unit for switching between a state in which the rays of illumination light is applied to the specimen and a state in which the rays of illumination light is not applied to the specimen.

Additional advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

First Embodiment

A first embodiment according to the present invention will now be described hereinafter in detail with reference to the accompanying drawings. This embodiment is directed to a microscope having an illumination device according to the present invention.

Figure 1:
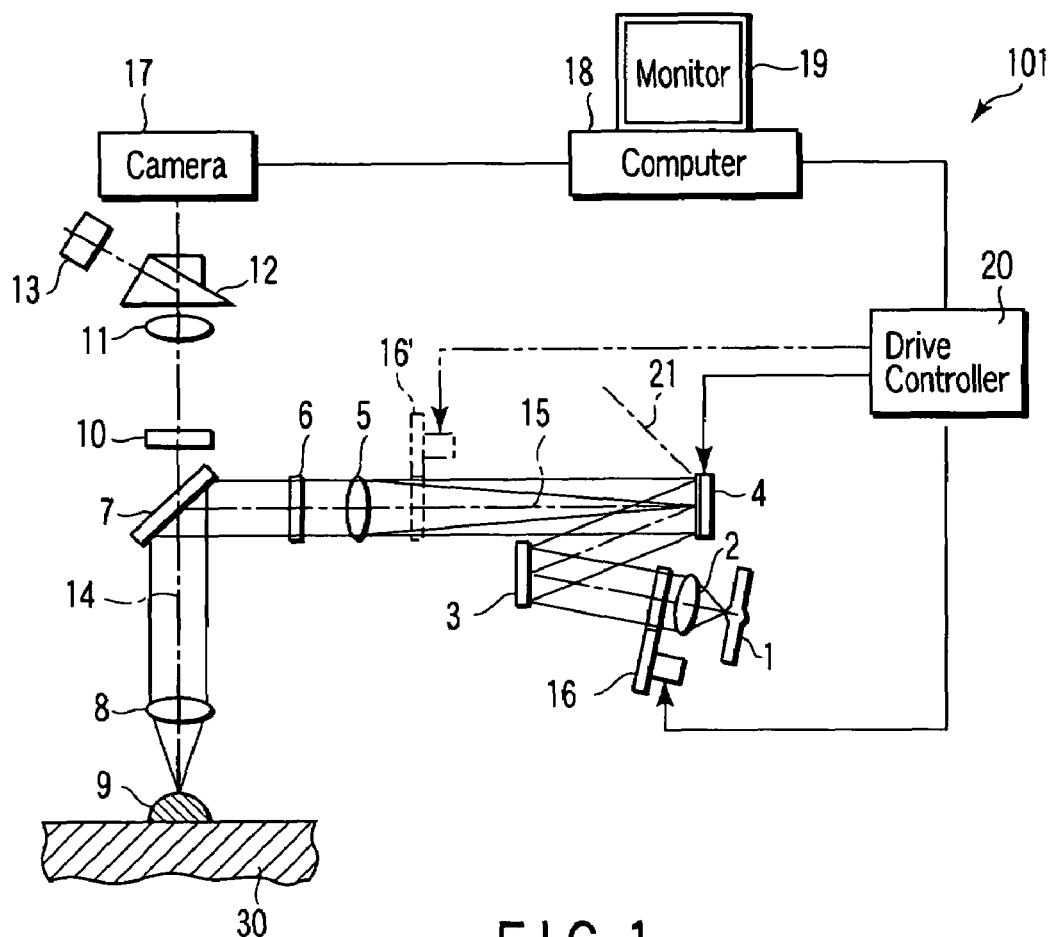
FIG. 1 schematically shows a microscope according to a first embodiment of the present invention.

FIG. 1 schematically shows a microscope 101 according to the first embodiment of the present invention. As shown in FIG. 1, the microscope 101 according to this embodiment comprises a stage 30, a light source 1 as illumination means for illuminating a specimen 9 mount on the stage 30, an objective 8, which is located so as to face the specimen 9, and a field stop projection lens 5, which is located on an illumination axis 15 between the light source 1 and the objective 8. The light source 1, which may comprise, e.g., a mercury lamp, emits rays of illumination light. The field stop projection lens 5 projects the rays of light emitted from the light source 1 to the specimen 9.

The microscope 101 further comprises, on the illumination axis 15 between the light source 1 and the field stop projection lens 5, a collimator 2, which collects the rays of illumination light from the light source 1, a shutter 16, which is allowed to open and close, as switch means having a function to prevent transmission of the rays of illumination light collected by the collimator 2, a reflection mirror 3, which reflects the rays of illumination light from the light source 1 when the shutter 16 is open, and a digital micromirror device 4 as a light deflector array, to which the rays of light reflected on the reflection mirror 3 fall on. The digital micromirror device 4 is located between the light source 1 and the field stop projection lens 5 on the illumination axis 15 passing through the objective 8 in conjugation with the specimen 9.

The microscope 101 further comprises, on an observation axis 14 of the objective 8, a dichroic mirror 7, which reflects the rays of illumination light from the light source 1 to the objective 8 and allows rays of observation light from the objective 8 to pass through, an absorption filter 10, which selectively absorbs the rays of observation light transmitted through the dichroic mirror 7, an image formation lens 11, which forms an image of the rays of observation light transmitted through the absorption filter 10, a prism 12, which deflects the rays of image-formed observation light, and an eyepiece 13, to which the rays of observation light deflected by the prism 12 enter.

Additionally, the microscope 101 comprises a drive controller 20, which drives and controls the digital micromirror device 4 and the shutter 16, a camera 17, such as a CCD, which picks up an observation image through the prism 12, a computer 18, which applies image processing to the observation image obtained by the camera 17 and controls the drive controller 20, and a monitor 19, which displays the observation image image-processed by the computer 18.

Figure 2:
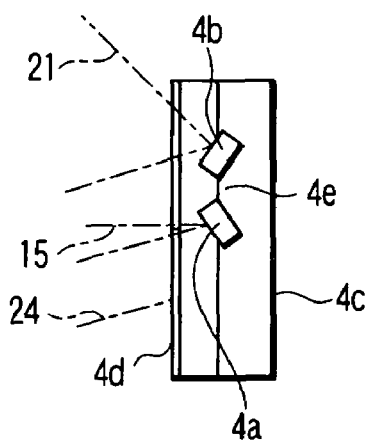
FIG. 2 schematically shows a digital micromirror device depicted in FIG. 1.

FIG. 2 schematically shows the digital micromirror device 4. As shown in FIG. 2, the digital micromirror device 4 is a DMD (Digital Micromirror Device) disclosed in, e.g., U.S. patent Publication No. 5,061,049, and is arranged vertically with respect to the illumination axis 15. The digital micromirror device 4 has micromirrors 4a and 4b as micro optical deflection portions (only two micromirrors are shown in FIG. 2 for the convenience's sake), a support portion 4c, which supports the micromirrors 4a and 4b, and a protection glass 4d, which protects the micromirrors 4a and 4b. The digital micromirror device 4 has, e.g., 1024×768 micromirrors 4a and 4b, which are two-dimensionally aligned. Each of the micromirrors 4a and 4b has a predetermined size dependent on the digital micromirror device 4, e.g., a square surface that is not more than 20 µm.

The surface of each of the micromirrors 4a and 4b can be independently obliquely fixed at a predetermined inclination angle ±α (e.g., 10°) with respect to the support portion 4c. The inclination angle ±α can independently vary in accordance with each of the micromirrors 4a and 4b by the drive controller 20. The inclination angle ±α of each of the micromirrors 4a and 4b is selectively controlled at a response speed of 10 µ second order by, e.g., turning on/off an application voltage to each of the micromirrors 4a and 4b. In this embodiment, it is defined that a micromirror 4a that has an inclination angle that causes incident rays of illumination light from the light source 1 to travel along the illumination axis 15 is in an "on" position, and a micromirror 4b that has an inclination angle that causes incident rays of illumination light from the light source 1 to travel along a retraction axis 21 (toward the outside) is in an "off" position.

The field stop projection lens 5 on the illumination axis 15 has two focal positions, which are individually positioned at a pupil position of the objective and on the surfaces of the micromirrors 4a and 4b. The field stop projection lens 5 comprises a lens group including at least one lens. The lens group preferably has a focal distance f1 of approximately 50 mm to 300 mm so as to project the micromirrors 4a and 4b with an appropriate size. This has the following reason. It is hard to construct a structure like the embodiment when the focal distance f1 is not more than 50 mm. Further, when the focal distance f1 exceeds 300 mm, a projection magnifying power of projection onto the surface of the specimen 9 becomes too small, so that a visual field with a good usability is hard to be assured, and the rays of illumination light become dark. In this embodiment, the focal distance f1 is, e.g., f1=170 mm.

Furthermore, in regard to a relationship between the digital micromirror device 4 and a size of an imaging element of a non-illustrated imager imaging an observation image of the specimen 9, assuming that f2 is a focal distance of the image formation lens 11, C is a diagonal size of the image element, and D is a diagonal size of the digital micromirror device 4 including the tiled micromirrors 4a and 4b, arrangement is facilitated when the following relationship is satisfied:

$0.3 < f2/f1 < 5$ and $0.3 < C/D < 6.6$.

In this embodiment, the focal distance f2 is, e.g., f2=180 mm.

Referring to FIGS. 1 and 2, an operation of the microscope according to the first embodiment having the above-mentioned structure will now be described. When the shutter 16 is open, rays of illumination light emitted from the light source 1 are collected by the collimator 2, reflected by the reflection mirror 3, and reach the digital micromirror device 4.

Of the rays of illumination light that have reached the digital micromirror device 4, rays of illumination light reflected by the micromirrors 4a in the "on" position travel to the field stop projection lens 5 along the illumination axis 15, and rays of illumination light reflected by the micromirrors 4b in the "off" position travel along the retraction axis 21. That is, the rays of illumination light reflected by the micromirrors 4b in the "off" position are not used for illumination. As described above, the micromirrors 4a and 4b of the digital micromirror device 4 are independently controlled between the "on" and "off" positions by the drive controller 20.

The rays of illumination light transmitted through the field stop projection lens 5 reach an excitation filter 6, and the excitation filter 6 selectively transmits components suitable for excitation of a fluorescent material of the specimen 9. The rays of illumination light transmitted through the excitation filter 6 are reflected by the dichroic mirror 7, and applied to the specimen 9 through the objective 8. The specimen 9 emits fluorescence corresponding to the applied rays of illumination light.

The fluorescence, which is emitted from the specimen 9, is collected by the objective 8, travels along the observation axis 14, and passes through the dichroic mirror 7. The fluorescence transmitted through the dichroic mirror 7 reaches the absorption filter 10, and the absorption filter 10 selectively transmits components suitable for observation. The fluorescence transmitted through the absorption filter 10 is image-formed by the image formation lens 11, deflected by the prism 12, and enters the eyepiece 13. An optical image observed by using the eyepiece 13 can be led to the camera 17 to be acquired as an observation image.

In the above-described operation, images of the micromirrors 4a and 4b of the digital micromirror device 4 is formed on a focal plane of the specimen 9 by the field stop projection lens 5 and the objective 8. Images of the micromirrors 4a in the "on" position are brightly projected since the rays of illumination light reflected by the micromirrors 4a are led to the surface of the specimen 9. On the other hand, image of the micromirrors 4b in the "off" position are very darkly projected since the rays of illumination light reflected by the micromirrors 4b are not led to the surface of the specimen 9. That is, the images of the micromirrors 4a and 4b are projected onto the specimen 9 as bright and dark in cooperation with the "on" and "off" positions of the micromirrors 4a and 4b. Therefore, only parts corresponding to the rays of illumination light reflected by the micromirrors 4a in the "on" position are illuminated.

Figure 3A:
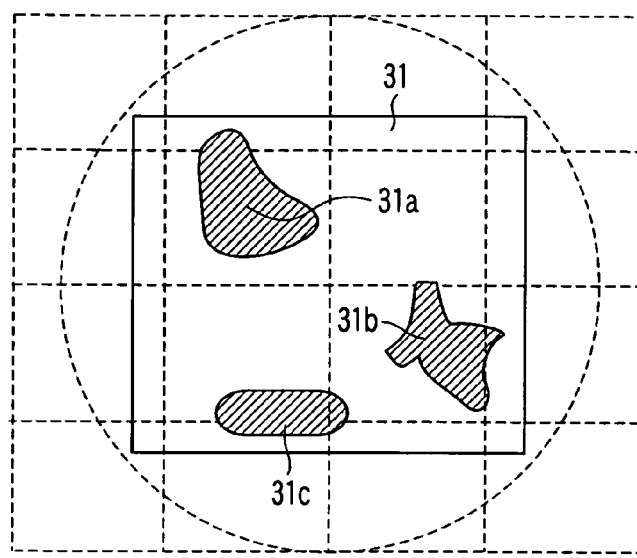
FIG. 3A shows irradiation areas of rays of illumination light.
Figure 3B:
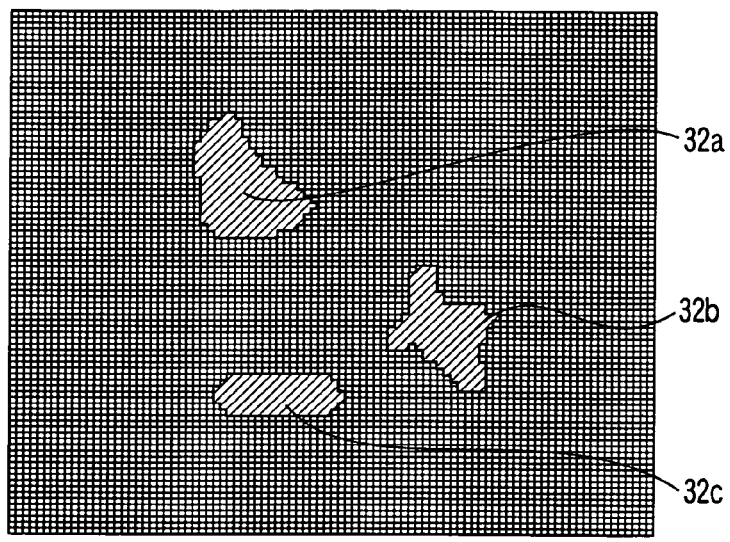
FIG. 3B shows irradiation areas obtained by a control of the digital micromirror device.
Figure 3C:
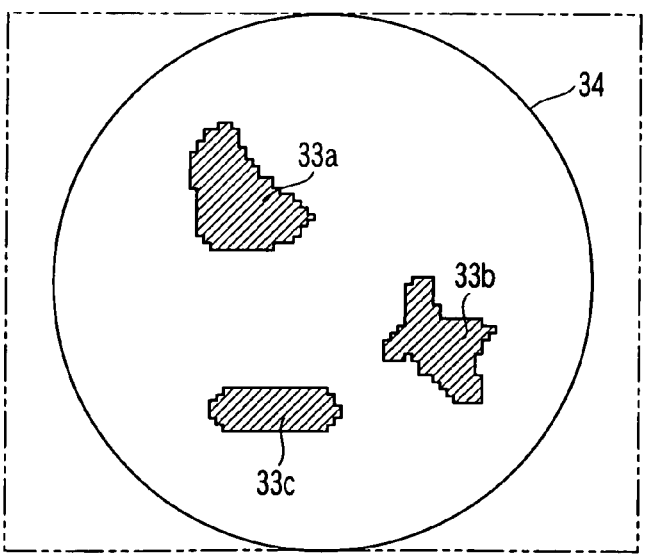
FIG. 3C shows observation areas.

FIGS. 3A, 3B and 3C show association between the control of the digital micromirror device 4 and irradiation areas in detail. When illuminating partial irradiation areas of the specimen 9, only the micromirrors 4a corresponding to irradiation areas 31a, 31b and 31c are controlled to be set to the "on" position based on the irradiation areas 31a, 31b and 31c projected onto a screen of the monitor 19 shown in FIG. 3A. That is, as shown in FIG. 3B, the rays of illumination light reflected by the micromirrors 4a are applied to only irradiation areas 32a, 32b and 32c, and parts other than these irradiation areas 32a, 32b and 32c are in a dark state.

As shown in FIG. 3C, a bright and dark pattern depicted in FIG. 3B is projected onto an image of the surface of the actual specimen 9, and the rays of illumination light are projected onto only observation areas 33a, 33b and 33c in a visual field 34. Therefore, partial illumination of the specimen 9 is enabled based on the "on" and "off" positions of the micromirrors 4a and 4b switched by the drive controller 20.

As shown in FIG. 3C, when there are irradiation areas to be illuminated, the drive controller 20 can also control so as to sequentially illuminate the irradiation areas 31a, 31b and 31c by switching the micromirrors 4a and 4b of the digital micromirror device 4 at a high speed. In this embodiment, although the three observation areas 33a, 33b and 33c to be observed are provided in the visual field 34, the number of observation areas to be observed is not restricted by controlling the digital micromirror device 4 while determining each of the micromirrors 4a and 4b as a minimum unit, and the rays of illumination light can be emitted in accordance with sizes or shapes of these observation areas.

Again referring to FIG. 2, the digital micromirror device 4 has a protection glass 4d to protect the micromirrors 4a and 4b, and gaps 4e exist between the micromirrors 4a and 4b. Therefore, the rays of reflected light that travel along a reflection axis 24, but they are weak, are produced from the protection glass 4d and the gaps 4e, and it becomes rays of stray light. Since the reflection axis 24 does not coincide with the illumination axis 15, but makes a smaller angle to the illumination axis than the retraction axis 21, rays of reflected light reflected near the illumination axis 15 may possibly becomes rays of stray light and be led to the field stop projection lens 5. Since the rays of stray light do not concern the control of the micromirrors 4a and 4b, it is produced even if the micromirrors 4a and 4b are in the off positions.

On the other hand, since the shutter 16 is provided on the illumination axis 15 between the light source 1 and the digital micromirror device 4, the shutter 16 completely prevents transmission of the rays of illumination light from the light source 1 when the shutter 16 is closed. Therefore, the rays of illumination light from the light source 1 are not led to the digital micromirror device 4. Opening and closing of the shutter 16 are cooperated with the control over the digital micromirror device 4 by the drive controller 20. Specifically, the drive controller 20 controls the inclination angle ±α of the micromirrors 4a and 4b so that only the observation areas of the specimen 9 are illuminated with the shutter 16 being closed, and then opens the shutter 16.

In this embodiment, as described above, since the rays of illuminated light directed from the light source 1 toward the digital micromirror device 4 is prevented when the shutter 16 is closed, the rays of stray light are not produced from the digital micromirror device 4 irrespective of the positions of the micromirrors 4a and 4b. Therefore, the shutter 16 is closed when the rays of illumination light does not have to be applied to the specimen 9, and the shutter 16 is opened only for a necessary period of time when the rays of illumination light are applied to the specimen 9. As a result, it is possible to completely prevent the rays of illumination light from being accidentally applied to the specimen 9.

The microscope 101 according to the first embodiment is used for, e.g., FRAP observation. This FRAP observation is an observation method by which a visual field is partially subjected to discoloration and movement of materials in a cell is observed by utilizing its restoration state. A description will now be given as to an example of a flow when performing FRAP observation by using the microscope 101 according to the first embodiment.

(1) Start observation.

(2) Close the shutter 16.

(3) Prepare an observation method (fluorescence observation, phase difference observation) in accordance with observation areas of a target (which will be described as fluorescence observation).
(4) Mount the specimen 9 on the stage 30.
(5) Instruct start of preliminary observation.
   a. Control all the micromirrors 4a of the digital micromirror device 4 to the on position.
   b. Turn on the light source.
   c. Open the shutter 16.
   d. Pick up an observation image by using the camera 17.
   e. Terminate image pickup.
   f. Close the shutter 16.
   g. Save the picked-up observation image.
(6) Terminate the preliminary observation.
(7) Start setting of parameters.
   a. Display the picked-up image on the monitor 19 (call the saved image).
   b. Specify the irradiation areas 31a, 31b and 31c to be irradiated with the rays of illumination light while confirming on the monitor 19 (one irradiation area may be specified, or the irradiation areas may be specified. Furthermore, it may be a freehand specification or a specification for each block which is previously classified.).
   c. Save the specified irradiation areas 31a, 31b and 31c in the computer 18.
   d. Call the saved irradiation areas 31a, 31b and 31c, and select the micromirrors 4a and 4b corresponding to these irradiation areas 31a, 31b and 31c.
   e. Set an application time of the rays of illumination light used for discoloration.
   f. Call the saved irradiation areas (observation areas) 31a, 31b and 31c, and specifies an observation range based on the called irradiation areas 31a, 31b and 31c.
   g. Set an observation time.
(8) Terminate setting of parameters.
(9) Instruct start of execution of an application.
   <Discoloration Illumination>
   a. Output drive of the selected micromirrors 4a and 4b to the drive controller 20.
   b. Output the set application time to the drive controller 20.
   c. Control the selected micromirrors 4a to the "on" position by using the drive controller 20.
   d. Open the shutter 16.
   e. Apply the rays of illumination light for discoloration to the irradiation areas 31a, 31b and 31c for only the set application time.
   f. Terminate irradiation.
   g. Close the shutter 16.
   <Progression Observation>
   h. Output drive of the micromirrors 4a and 4b corresponding to the observation areas to the drive controller 20.
   i. Control the selected micromirrors 4a to the "on" position by using the drive controller 20.
   j. Open the shutter 16.
   k. Pick up an observation image by using the camera 17.
   l. Terminate the progression observation.
   m. Close the shutter 16.
(10) Terminate the application.
(11) Remove the specimen 9 from the stage 30.
(12) Terminate the observation.

In the above-described flow, (5) the preliminary observation and (9) execution of the application are automatically performed by using software incorporated in the computer 18.

In the FRAP observation, a range to be subjected to discoloration (a position, a shape and a size of a target) is set by controlling the digital micromirror device 4, and fluorescence of a cell of the specimen 9 must be partially discolored by applying the rays of illumination light to the set range for a fixed time period. Therefore, as described above, an affection of the stray light cannot be ignored. In particular, when there is no shutter, although (7) start of setting of parameters to (8) end of setting of parameters take the time because of an artificial manipulation, the specimen 9 is kept being irradiated with the rays of illumination light in this period. When transmission of rays of light is not prevented in the specimen 9 during setting of parameters, not only a cell is damaged, but also discoloration of fluorescence occurs in the entire specimen 9, and hence an influence to a degradation in an S/N ratio in execution of an application can be also considered.

When performing the FRAP observation by using the microscope 101 according to the first embodiment, the shutter 16, which can be controlled to open and close, is located on the illumination axis, and the stray light produced from the digital micromirror device 4 can be prevented by closing the shutter 16 according to needs. In other words, in the above-described flow, since the shutter 16 is open for periods corresponding to (5) c to f, (9) d to g and j to m, the stray light is not applied to a cell and this does not adversely affect in the flow other than these periods.

In the above-described flow, in the preliminary observation and the application observation, the automatic control is performed by the software and the control over the digital micromirror device 4 is cooperated with opening and closing of the shutter 16, and hence a time to apply the rays of illumination light to the specimen 9 can be set to a minimum necessary level. Therefore, in the FRAP observation using the microscope according to the first embodiment, excessive irradiation of the specimen 9 with the rays of illumination light based on the stray light can be suppressed to a maximum level, and discoloration relative to the specimen 9 can be performed while keeping the on/off characteristics of the digital micromirror device 4. As a result, the excellent observation with less damage to a cell and the good contrast of discoloration can be performed.

It is to be noted that the shutter 16 is positioned in the illumination axis between the collimator 2 and the reflection mirror 3 in this embodiment, but it may be positioned in the illumination axis between the digital micromirror device 4 and the field stop projection lens 5 as indicated by a dotted line in FIG. 1. In such a structure, although the stray light is produced from the digital micromirror device 4 even if the shutter 16' is closed, the stray light is not led to the field stop projection lens 5 since the shutter 16' is located on the front side on the illumination axis 15 of the field stop projection lens 5.

Second Embodiment

A second embodiment according to the present invention will now be described in detail hereinafter with reference to the accompanying drawings. This embodiment is directed to a microscope having another illumination device according to the present invention.

Figure 4:
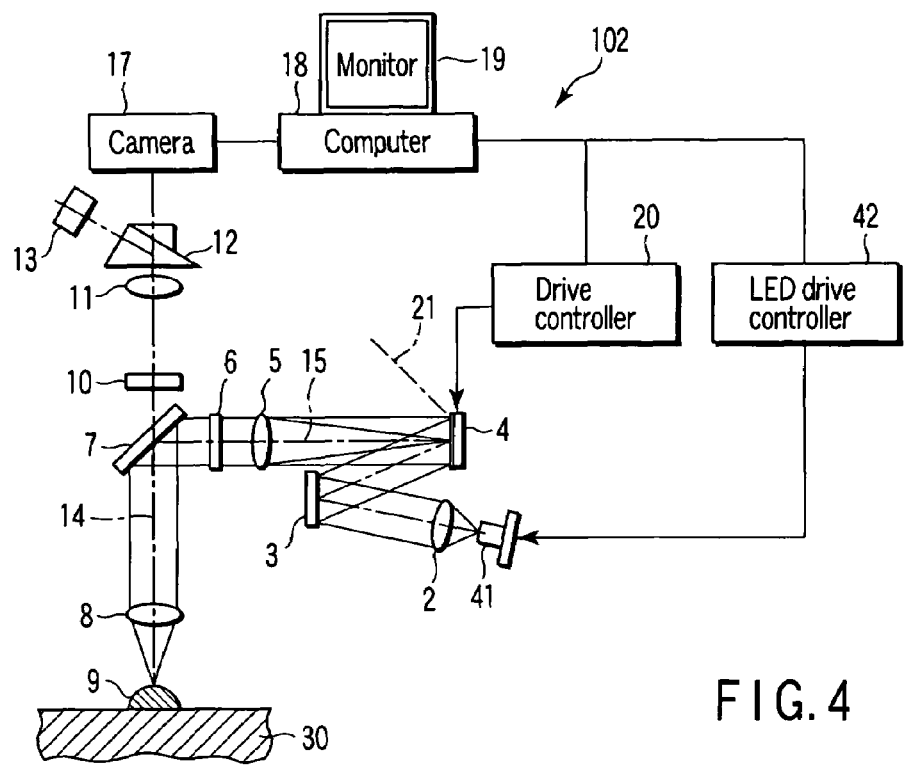
FIG. 4 schematically shows a microscope according to a second embodiment of the present invention.

FIG. 4 schematically shows a microscope 102 according to the second embodiment of the present invention. As shown in FIG. 4, the microscope 102 according to this embodiment has substantially the same structure as the microscope 101 according to the first embodiment, but it is different from the first embodiment in regard to illumination means in particular. In the second embodiment, like reference numerals denote members equal to those in the first embodiment in order to eliminate the detailed explanation of the operation, and a description will be given as to differences from the first embodiment.

As shown in FIG. 4, the microscope 102 according to this embodiment has an LED light source 41 as illumination means, and an LED drive controller 42, which controls the LED light source 41. On and off of the LED light source 41 can switched at a high speed by the LED drive controller 42, and the LED drive is controller 42 is controlled by the computer 18. Moreover, the shutter 16 is eliminated in this embodiment. Any other structures are the same as those in the first embodiment. A state in which the LED light source 41 is turned on by the LED drive controller 42 corresponds to a state in which the shutter 16 is open in the first embodiment, and a stage in which the LED light source 41 is turned off corresponds to a state in which the shutter 16 is closed in the first embodiment.

An operation of the second embodiment will now be described with reference to FIG. 4. Rays of illumination light from the LED light source 41 are reflected by the reflection mirror 3 and reach the digital micromirror device 4 like the first embodiment. Of the rays of illumination light that has reached the digital micromirror, rays of illumination light reflected by the micromirrors 4a in the "on" position travel to the field stop projection lens 5 along the illumination axis 15, and rays of illumination light reflected by the micromirrors 4b in the "off" position travel along the retraction axis 21. That is, the rays of illumination light reflected by the micromirrors 4b in the "off" position are not used for illumination. As described above, the micromirrors 4a and 4b of the digital micromirror device 4 are independently controlled between the "on" and "off" positions by the drive controller 20.

The rays of illumination light directed to the field stop projection lens 5 are applied to the specimen 9 like the first embodiment, and fluorescence emitted from the specimen 9 is also led to the eyepiece 13 by the same operation.

Switching on/off the LED light source 41 is cooperated with the control over the digital micromirror device 4 by the drive controller 20. Specifically, the drive controller 20 controls the inclined angle ±α of the micromirrors 4a so as to illuminate only the observation areas of the specimen 9 with the LED light source 41 being turned off, and then turns on the LED light source 41.

As described above, in the state that the LED light source 41 is off, since the rays of illumination light itself are not emitted, rays of stray light are not produced from the protection glass 4d and the gaps 4e of the digital micromirror device 4. That is, the rays of illumination light are not unnecessarily applied to the specimen 9. Therefore, the LED light source 41 is turned off when the rays of illumination light does not have to be applied to the specimen 9, and the LED light source 41 is turned on when the rays of illumination light must be applied to the specimen 9. As a result, the rays of illumination light can be completely prevented from being unnecessarily applied to the specimen 9.

A description will now be given as to an example of a flow when the FRAP observation is carried out by using the microscope 102 according to the second embodiment.

(1) Start observation.
(2) Confirm that the LED light source 41 is off.
(3) Prepare an observation method (fluorescence observation, phase difference observation) of the microscope in accordance with observation areas of a target (a description will be given on the assumption of fluorescence observation).
(4) Mount the specimen 9 on the stage 30.
(5) Instruct start of preliminary observation.
   a. Control all the micromirrors 4a of the digital micromirror device 4 to the on position.
   b. Turn on the LED light source 41.
   c. Pick up an observation image by using the camera 17.
   d. Terminate image pickup.
   e. Turn off the LED light source 41.
   f. Save the picked-up observation image.
(6) Terminate the preliminary observation.
(7) Instruct start of specification of parameters.
   a. Display the picked-up image on the monitor 19 (call the saved image).
   b. Specify the irradiation areas 31a, 31b and 31c to be irradiated with the rays of illumination light while confirming on the monitor 19 (one irradiation area may be specified, or the irradiation areas may be specified. Further, it may be a freehand specification or a specification for each block which is previously classified.).
   c. Save the specified irradiation areas 31a, 31b and 31c in the computer 18.
   d. Call the saved irradiation areas 31a, 31b and 31c, and select the micromirrors 4a and 4b corresponding to these irradiation areas 31a, 31b and 31c.
   e. Set an application time of the rays of illumination light for discoloration.
   f. Call the saved irradiation areas (observation areas), and specify an observation range.
   g. Set an observation time.
(8) Terminate specification of parameters.
(9) Instruct start of execution of an application.
   <Discoloration Illumination>
   a. Output drive of the selected micromirrors 4a and 4b to the drive controller 20.
   b. Output the set application time to the drive controller 20.
   c. Control the selected micromirrors 4a to the "off" position by using the drive controller 20.
   d. Turn on the LED light source 41.
   e. Apply the rays of illumination light for discoloration to the irradiation areas 31a, 31b and 31c only for the set irradiation time.
   f. Terminate irradiation.
   g. Turn off the LED light source 41.
   <Progression Observation>
   h. Output drive of the micromirrors 4a and 4b corresponding to the observation areas to the drive controller 20.
   i. Control the selected micromirrors 4a to the "on" position by using the drive controller 20.
   j. Turn on the LED light source 41.
   k. Pick up an observation image by using the camera 17.
   l. Terminate the progression observation.
   m. Turn off the LED light source 41.
(10) Terminate the application.
(11) Remove the specimen 9 from the stage 30.
(12) Terminate the observation.

In the above-described flow, (5) the preliminary observation and (9) execution of the application are automatically performed by software incorporated in the computer 18 like the first embodiment.

When performing the FRAP observation by using the microscope 102 according to the second embodiment, the rays of illumination light can be completely prevented from being applied to the specimen 9 when irradiation is not required by turning on/off the LED light source 41 according to needs. In other words, in the above-described flow, since the LED light source 41 is on only for periods of (5) b to e and (9) d to g and j to m, the rays of illumination light is not applied to the specimen 9 in the flow except this. Therefore, the rays of illumination light can be applied to the specimen 9 only for a necessary time period.

Furthermore, since the LED light source 41 can be switched on/off in 100 nano-second order, the rays of illumination light can be switched at a high speed in cooperation with the digital micromirror device 4, which can be switched on/off in 10 μ-second order. Therefore, the observation with less affect of a time lag is enabled with respect to a change in a sample when shifting from discoloration illumination to progression observation.

In the above-described flow, since the preliminary observation and the application observation are automatically controlled by software and the control over the digital micromirror device 4 and turning on/off the LED light source are controlled in cooperation with each other, the application time of the rays of illumination light relative to the specimen 9 can be suppressed to a necessary minimum level. Therefore, in the FRAP observation using the microscope according to the first embodiment, application of an excessive rays of illumination light to the specimen 9 due to the stray light can be suppressed as much as possible, discoloration of the specimen 9 can be effected while keeping the on/off characteristics of the digital micromirror device 4. As a result, it is possible to conduct the excellent observation having a good contrast of discoloration and less damages to a cell.

Third Embodiment

A third embodiment according to the present invention will now be described in detail hereinafter with reference to the accompanying drawings. This embodiment is directed to a microscope having another illumination device according to the present invention.

Figure 5:
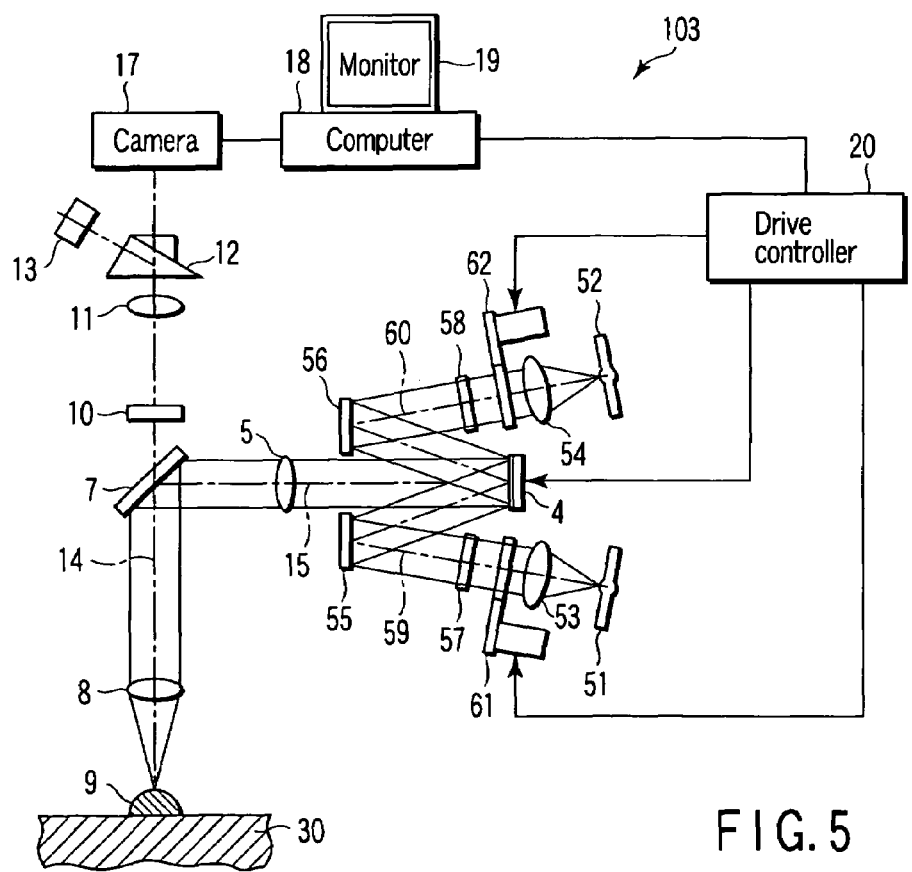
FIG. 5 schematically shows a microscope according to a third embodiment of the present invention.

FIG. 5 schematically shows a microscope 103 according to the third embodiment of the present invention. As shown in FIG. 5, the microscope 103 according to this embodiment has substantially the same structure as that of the microscope 101 according to the first embodiment, but the third embodiment is different from the first embodiment in that two illumination means are provided. In the third embodiment, like reference numerals denote members equal to those in the first embodiment, the detailed description about the operation is eliminated, and differences from the first embodiment will be mainly explained.

The microscope 103 according to the third embodiment has a first light source 51 and a second light source 52 as illumination means for illuminating the specimen 9 mounted on the stage 30. The digital micromirror device 4 and the field stop projection lens 5 are located on the illumination axis 15 common between the first and second light sources 51 and 52 and the specimen 9. The first and second light sources 51 and 52 comprise, e.g., mercury lamps.

The microscope 103 comprises, on a first illumination axis 59 between the first light source 51 and the digital micromirror device 4, a first collimator 53, which collects rays of illumination light from the first light source 51, a first shutter 61, which is allowed to open and close, as switch means having a function to prevent transmission of the rays of illumination light collected by the first collimator 53, a first excitation filter 57, which selectively transmits the rays of illumination light from the first light source 51, and a first reflection mirror 55, which reflects the transmitted rays of illumination light.

The microscope 103 further comprises, on a second illumination axis 60 between the second light source 52 and the digital micromirror device 4, a second collimator 54, which collects rays of illumination light from the second light source 52, a second shutter 62, which is allowed to open and close, as switch means having a function to prevent transmission of the rays of illumination light collected by the second collimator 54, a second excitation filter 58, which selectively transmits the rays of illumination light from the second light source 52, and a second reflection mirror 56, which reflects the transmitted rays of illumination light.

The drive controller 20 according to the third embodiment controls opening and closing operations of the first and second shutters 61 and 62 in cooperation with the digital micromirror device 4. Any other structures are the same as those of the first embodiment.

An operation of the third embodiment will now be described with reference to FIG. 5. When the first shutter 61 is open, the rays of illumination light emitted from the first light source 51 is collected by the first collimator 53, selectively transmitted through the first excitation filter 57, reflected by the first reflection mirror 55 and then reaches the digital micromirror device 4. Likewise, when the second shutter 62 is open, the rays of illumination light emitted from the second light source 52 is collected by the second collimator 54, selectively transmitted through the second excitation filter 58, reflected by the second reflection mirror 56 and then reaches the digital micromirror device 4.

Of the rays of illumination light of the first illumination axis which has reached the digital micromirror device 4, rays of illumination light reflected by the micromirrors 4a in the "on" position travel to the field stop projection lens 5 along the illumination axis 15, and rays of illumination light reflected by the micromirrors 4b in the "off" position travel along the retraction axis 21. That is, the rays of illumination light reflected by the micromirrors 4b in the "off" position are not used for illumination. Moreover, of the rays of illumination light of the second illumination axis 60, rays of illumination light reflected by the micromirrors 4b in the "off" position travel to the field stop projection lens 5 along the illumination axis 15, and rays of illumination light reflected by the micromirrors 4a in the "on" position travel along the illumination axis not to be used for illumination.

As described above, the micromirrors 4a and 4b of the digital micromirror device 4 are respectively independently controlled between the "on" and "off" positions by the drive controller 20.

In the microscopic observation, efficient rays of illumination light utilizing respective characteristics may be applied depending on different light sources or wavelengths in some cases. For example, in the FRAP observation, an energy may be increased by shortening a wavelength of illumination used for discoloration, or a light source with a high intensity for discoloration, which is different from one for observation, may be used in some cases in order to perform discoloration in a short time. In this embodiment, the rays of illumination light from the first light source 51 is selected so as to have characteristics suitable for observation by the first excitation filter 57, and the rays of illumination light from the second light source 52 is selected so as to have characteristics suitable for discoloration by the second excitation filter 58.

A description will now be given as to an example of a flow when performing the FRAP observation by using the microscope 103 according to the third embodiment.

(1) Start observation.
(2) Close the first and second shutters 61 and 62.
(3) Prepare an observation method of the microscope (fluorescence observation, phase difference observation) in accordance with observation areas of a target (a description will be given on the assumption of fluorescence observation).
(4) Mount the specimen 9 on the stage 30.
(5) Instruct start of preliminary observation.
  a. Control all the micromirrors 4a of the digital micromirror device 4 to the on position.
  b. Open the first shutter 61.
  c. Pick up an observation image by using the camera 17.
  d. Terminate image pickup.
  e. Close the first shutter 61.
  f. Save the picked-up observation image.
(6) Terminate preliminary observation.
(7) Instruct start of setting of parameters.
  a. Display the picked-up image in the monitor 19 (call the saved image).
  b. Instruct the irradiation areas 31a, 31b and 31c to be irradiated with the rays of illumination light while confirming on the monitor 19 (one irradiation area may be specified, or the irradiation areas may be specified. Further, it may be a freehand specification or a specification for each block which is previously classified.).
  c. Save the specified irradiation areas 31a, 31b and 31c in the computer 18.
  d. Call the saved irradiation areas 31a, 31b and 31c, and select the micromirrors 4a and 4b corresponding to these irradiation areas 31a, 31b and 31c.
  e. Set an application time of the rays of illumination light for discoloration.
  f. Call the saved irradiation areas (observation areas), and specify an observation range.
  g. Set an observation time.
(8) Terminate parameter specification.
(9) Instruct start of execution of an application.
  <Discoloration Illumination>
  a. Output drive of the selected micromirrors 4a and 4b to the drive controller 20.
  b. Output the set application time to the drive controller 20.
  c. Control the selected micromirrors 4a to the "off" position by using the drive controller 20.
  d. Open the second shutter 62.
  e. Apply the rays of illumination light for discoloration to the irradiation areas only for the set irradiation time.
  f. Terminate irradiation.
  g. Close the second shutter 62.
  <Progression Observation>
  h. Output drive of the micromirrors 4a and 4b corresponding to the observation areas to the drive controller 20.
  i. Control the selected micromirrors 4a to the "on" position by using the drive controller 20.
  j. Open the first shutter 61.
  k. Pick up an observation image by using the camera 17.
  l. Terminate the progression observation.
  m. Close the first shutter 61.
(10) Terminate the application.
(11) Remove the specimen 9 from the stage 30.
(12) Terminate the observation.

In the above-described flow, (5) the preliminary observation and (9) execution of the application are automatically carried out by software incorporated in the computer 18 like the first embodiment.

When performing the FRAP observation by using the microscope 103 according to the third embodiment, the first shutter 61, which can be controlled to open and close, is located on the illumination axis from the first light source 51, and the second shutter 62, which can be controlled to open and close, is located on the illumination axis from the second light source 52. Rays of stray light produced from the digital micromirror device 4 can be prevented by closing the respective shutters 61 and 62 according to needs. In other words, in the above-described flow, the first shutter 61 is opened only for periods of (5) b to e and (9) j to me, and the second shutter 62 is opened only for periods of (9) d to g. Therefore, the stray light is not applied to a cell and an adverse affect cannot be given.

In the above-described flow, the preliminary observation and the application observation are automatically controlled by the software, and the control over the digital micromirror device 4 and opening and closing of the first and second shutters 61 and 62 are controlled in cooperation with each other. Therefore, an application time of the rays of illumination light to the specimen 9 can be suppressed to a necessary minimum level. Therefore, in the FRAP observation using the microscope according to the third embodiment, application of an excessive rays of illumination light to the specimen 9 due to the stray light can be suppressed as much as possible, and discoloration of the specimen 9 keeping the on/off characteristics of the digital micromirror device 4 can be effected. As a result, it is possible to perform the excellent observation with less damages to a cell and a good contrast of discoloration.

The FRAP observation has been described in the third embodiment, but two-color illumination can be effected by changing characteristics of the first and second excitation filters. In this case, for example, the first excitation filter 57 and the second excitation filter 58 can comprise band pass filters having different wavelength bands. In such a structure, the rays of illumination light from the first light source 51 is applied to the irradiation areas 33 in FIG. 3, and the rays of illumination light from the second light source 52 is applied to any other areas.

It is to be noted that the first shutter 61 is positioned on the first illumination axis 59 between the first collimator 53 and the first reflection mirror 55 and the second shutter 62 is positioned on the second illumination axis 60 between the second collimator 54 and the second reflection mirror 56 in this embodiment. However, as indicated by a phantom line in FIG. 1, they may be positioned on the illumination axis 15 between the digital micromirror device 4 and the field stop projection lens 5 (position of the shutter 16' in FIG. 1). In this structure, the stray light can be prevented from being led to the field stop projection lens 5 by controlling the opening and closing operations of the shutters as a shutter common to the first light source and the second light source.

Additionally, although the mercury lamps are used as the two light sources 51 and 52 in the third embodiment, LED light sources may be used for one or both of the light sources and the shutters. In this case, the structure and the operation of each LED light source is the same as those of the LED light source in the second embodiment.

Additional advantages and modifications will readily occur to those skilled in the art. Therefore, the invention in its broader aspects is not limited to the specific details and representative embodiments shown and described herein.

Accordingly, various modifications may be made without departing from the spirit or scope of the general invention concept as defined by the appended claims and their equivalents.

What is claimed is:

1. A microscope comprising:
  a light source which illuminates a specimen;
  an objective located opposite to the specimen;
  a field stop projection lens, located on an illumination axis between the light source and the objective, to narrow a field of view of the specimen;
  a digital micromirror device which is conjugate with the specimen via the field stop projection lens and the objective, and which comprises a plurality of two-dimensionally arrayed micromirrors that are individually selectable to be turned on so as to reflect light along the illumination axis to the specimen;
  a reflection mirror which reflects illumination light from the light source onto the digital micromirror device;
  a shutter;
  a dichroic mirror which is located on an observation axis of the objective so as to reflect the illumination light emitted from the light source onto the objective and to pass observation light from the objective;
  an excitation filter which selectively passes light components of the illumination light that are suitable for excitation of a fluorescent material in the specimen;
  an absorption filter which selectively absorbs light components of the observation light;
  a camera located on the observation axis to pick up an observation image;
  a monitor which displays the image picked up by the camera;
  a drive controller which controls the digital micromirror device and the shutter; and
  a computer which controls the drive controller, camera and monitor such that:
    before picking up an image of the specimen, all of the micromirrors are turned on while the shutter is closed, and the shutter is opened to cause the illumination light to be guided to the specimen via the turned-on micromirrors, such that an image of a part of the specimen that is located within the field of view is picked up by the camera, and wherein the shutter is closed after an image pick-up operation of the camera ends;
    the image picked up by the camera is displayed by the monitor, an irradiation area to be irradiated with the illumination light is specified, and respective ones of the micromirrors which correspond to the specified irradiation area are specified; and
    before picking up an image of the sample again, only the specified ones of the micromirrors are turned on while the shutter is closed, and the shutter is opened to cause the illumination light to be guided to the specimen via the turned-on micromirrors, such that another image of the part of the specimen that is located within the field of view is picked up by the camera, and wherein the shutter is closed after the image pick-up operation of the camera ends;
    wherein when the shutter is closed, the shutter prevents stray light, from gaps between adjacent ones of the micromirrors, from reaching the specimen.

2. The microscope according to claim 1, wherein the shutter is located between the light source and the reflection mirror.

3. The microscope according to claim 1, wherein the shutter is located between the digital micromirror device and the field stop projection lens.

4. A microscope comprising:
  a light source which illuminates a specimen;
  an objective located opposite to the specimen;
  a field stop projection lens, located on an illumination axis between the light source and the objective, to narrow a field of view of the specimen;
  a digital micromirror device which is conjugate with the specimen via the field stop projection lens and the objective, and which comprises a plurality of two-dimensionally arrayed micromirrors that are individually selectable to be turned on so as to reflect light along the illumination axis to the specimen;
  a reflection mirror which reflects illumination light from the light source onto the digital micromirror device;
  a shutter;
  a dichroic mirror, which is located on an observation axis of the objective so as to reflect the illumination light emitted from the light source onto the objective and to pass observation light from the objective;
  an excitation filter, which selectively passes light components of the illumination light that are suitable for excitation of a fluorescent material in the specimen;
  an absorption filter which selectively absorbs light components of the observation light;
  a camera located on the observation axis to pick up an observation image;
  a drive controller which controls the digital micromirror device and the shutter; and
  a computer which controls the drive controller such that:
    before picking up an image of the specimen, desired ones of the micromirrors are turned on while the shutter is closed, and the shutter is opened to cause the illumination light to be guided to the specimen via the turned-on micromirrors, and wherein the shutter is closed after an image pick-up operation of the camera ends, so as to prevent stray light, from gaps between adjacent ones of the micromirrors, from reaching the specimen.

5. The microscope according to claim 4, wherein the shutter is located between the light source and the reflection mirror.

6. The microscope according to claim 4, wherein the shutter is located between the digital micromirror device and the field stop projection lens.

* * * * *